(12) United States Patent
Tonegawa et al.

(10) Patent No.: US 9,009,158 B2
(45) Date of Patent: Apr. 14, 2015

(54) COMPUTER CAPABLE OF RETRIEVING AMBIGUOUS INFORMATION

(75) Inventors: Satoko Tonegawa, Yamato (JP); Kunihiko Miwa, Hiratsuka (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 429 days.

(21) Appl. No.: 12/901,921

(22) Filed: Oct. 11, 2010

(65) Prior Publication Data

US 2011/0087663 A1    Apr. 14, 2011

(30) Foreign Application Priority Data

Oct. 14, 2009  (JP) .................................. 2009-236872

(51) Int. Cl.
*G06F 17/30*      (2006.01)

(52) U.S. Cl.
CPC ...... *G06F 17/3012* (2013.01); *G06F 17/30126* (2013.01)

(58) Field of Classification Search
CPC .................... G06F 17/30705; G06F 17/20321; G06F 17/30047
USPC .................................................. 707/830, 737
See application file for complete search history.

(56) References Cited

U.S. PATENT DOCUMENTS

| | | | | |
|---|---|---|---|---|
| 7,739,357 | B2 * | 6/2010 | Gould | 709/219 |
| 8,176,482 | B1 * | 5/2012 | Felix | 717/168 |
| 8,245,078 | B1 * | 8/2012 | Chatterjee et al. | 714/20 |
| 2006/0136406 | A1 * | 6/2006 | Reponen | 707/4 |
| 2007/0043700 | A1 * | 2/2007 | Dawson et al. | 707/3 |
| 2007/0162907 | A1 * | 7/2007 | Herlocker et al. | 718/100 |
| 2007/0219941 | A1 * | 9/2007 | Schnurr et al. | 707/1 |
| 2007/0244926 | A1 * | 10/2007 | Vitanov et al. | 707/104.1 |
| 2008/0307350 | A1 * | 12/2008 | Sabatelli et al. | 715/779 |
| 2010/0115334 | A1 * | 5/2010 | Malleck et al. | 714/15 |

FOREIGN PATENT DOCUMENTS

| | | |
|---|---|---|
| JP | 05-189183 | 7/1993 |
| JP | 10-031660 | 5/1996 |
| JP | 2000-099588 | 4/2000 |
| JP | 2000-172669 | 6/2000 |
| JP | 2000-259607 | 9/2000 |
| JP | 2001-209658 | 8/2001 |
| JP | 2002073684 | 3/2002 |
| JP | 20050216285 | 8/2005 |
| JP | 2007-272801 | 10/2007 |
| JP | 2007-299289 | 11/2007 |
| JP | 2008-003968 | 1/2008 |
| JP | 2008-005175 | 1/2008 |
| JP | 2008-117408 | 5/2008 |
| JP | 2009-064256 | 3/2009 |

* cited by examiner

*Primary Examiner* — Rehana Perveen
*Assistant Examiner* — Alexander Khong
(74) *Attorney, Agent, or Firm* — Kunzler Law Group

(57) ABSTRACT

The present invention is to support the retrieval of an ambiguous file stored on a computer. Desktop space images are generated at predetermined time intervals, and metadata for each desktop space image is created from internally used data and externally input data existing at the time. The metadata consists of multiple pieces of tag data, and part of tag data is a target file to be searched for. Upon searching for the target file, a user selects a desktop space image that evokes the target file from among the multiple desktop space images initially displayed. The selected desktop space image is displayed and the target file is selected from the metadata associated with the desktop space image displayed. The desktop space image can refresh a user's recollection about the target file, and hence allows the user to narrow down the scope of search.

20 Claims, 6 Drawing Sheets

150

| DESKTOP SPACE IMAGE: IMAGE #001 | TAG DATA ITEM | TAG DATA |
|---|---|---|
| | ANNOTATION: | aaa111 |
| | SOFTWARE NAME:<br>FILE NAME:<br>PAGE: | DOCUMENT CREATION SUPPORT |
| | SOFTWARE NAME:<br>FILE NAME:<br>PAGE: | PRESENTATION SUPPORT<br>bbb.xy2<br>10 |
| | SOFTWARE NAME:<br>FILE NAME:<br>URL: | WEB BROWSER<br>c.html<br>http://www.aaa.bb.c |
| | SOFTWARE NAME:<br>FILE NAME:<br>START TIME:<br>STOP TIME: | VIDEO PLAYBACK<br>ccc.xy3<br>00:bb:cc<br>00:dd:ee |
| | SOFTWARE NAME:<br>FILE NAME:<br>START TIME:<br>STOP TIME: | CAMERA PROCESSING |
| | SOFTWARE NAME:<br>FILE NAME:<br>START TIME:<br>STOP TIME: | MICROPHONE PROCESSING<br>eee.xy4<br>aa:bb:cc<br>cc:dd:ee |
| | SOFTWARE NAME:<br>START TIME:<br>STOP TIME:<br>IP ADDRESS: | IP ADDRESS<br>00:aa:cc<br>00:ee:ff<br>a.b.c.d |
| | SOFTWARE NAME:<br>START TIME:<br>STOP TIME:<br>HEART RATE: | HEART RATE MEASUREMENT<br>00:aa:cc<br>00:ee:ff<br>nnn |

FIG. 4

COMPUTER CAPABLE OF RETRIEVING AMBIGUOUS INFORMATION

BACKGROUND

1. Field

Subject matter presented herein relates to a technique for retrieving ambiguous information stored on a computer, and more particularly, to a technique for recreating a user's sense of déjà vu about targeted information to support the retrieval.

2. Description of the Related Art

Computers today are used for a variety of purposes, such as document creation, presentation, access to Web sites or image and audio playback. As the capacity of a hard disk drive (HDD) has been dramatically increased in recent years, the volume of data to be stored on a computer has also been being increased. Upon accessing a file that a user has accessed in the past, it will be easy to search for the file if the user remembers property information such as the file name or the date and time of creation of the file. However, if the user does not remember the property information, the user will have to fumble through large amounts of information to find the target file. There has been a method using a calendar to narrow down targets to be searched for. In this method, the file can be found based on information registered with each date on the calendar.

There has also been a technique for reducing the time to search again for a site on the Internet that one visited once. In this technique, sites and information already searched and browsed on the Internet are accumulated en bloc as thumbnails (reduced samples of images) to enable browsing of the past searched sites and information again in order to simplify the comparison examination between pieces of information as targets to be collected. Another technique for browsing a media file at high speed is configured to browse, for time periods, specific types of media files, annotated or bookmarked media files or a browsable parameter designated by another user so that the speed of browsing or the scrolling function can be altered depending on the desire of the user.

Although the method of narrowing down targets to be searched for based on the date on the calendar is effective for data registered with the calendar, a file to be searched for (hereinafter called "target file") is not always registered with the calendar. In addition, if the user does not remember the date, the user will have difficulty finding the target file.

Images associated with a file are more memorable for people than property information, such as the file name or the date and time of creation of the file. If there is a mechanism for finding a specific file through images, the convenience of computers can be further enhanced.

SUMMARY

A user's recollection about a target file is refreshed to allow the user to narrow down the scope of search in order to retrieve the target file stored on a computer. In preparation of a subsequent search for a file the user has accessed, multiple events that occur in chronological order are defined. Then, desktop space images upon generation of the events and metadata including multiple pieces of tag data existing as an operating environment of the computer within a predetermined period from the generation of each event are recorded in a recording device of the computer. The metadata is information for constructing the operating environment of the computer. Upon searching for the target file, the multiple recorded desktop space images are initially displayed. This allows the user to evoke a memory of the target file being processed around the time of generation of a desktop space image among the multiple desktop space images displayed.

Among the multiple desktop space images displayed, when the user selects a specific desktop space image that is most likely to evoke a memory of the operating environment of the computer upon accessing the target file, metadata associated with the specific desktop space image is displayed on a display. Then, when the user selects tag data from the metadata, the target file corresponding to the tag data is run. Thus, running the target file allows the user to ensure the awareness of the target file that has remained ambiguous. The metadata can be created by software for internally used data, the software including document creation support software, presentation support software, Web browser, mailing software, spreadsheet software and video playback software, or by software for externally input data selected from a group of camera processing software, microphone processing software, IP address acquiring software, and/or software for controlling an external device.

Each event can be generated based on an element(s) including when a file page being displayed is changed, when a window created by software becomes active, when a microphone starts recording, when a camera starts taking an image, when an IP address is changed, and/or when there is input from a keyboard. Upon recording metadata, if tag data is updated during a period between the previous event and the present event, the latest updated tag data will be recorded. Note that, upon recording a desktop space image based on the present event, even if tag data exists between the previous event and the present event but does not exist as the operating environment of the computer in the instant of the generation of the present event, the tag data will be recorded as metadata.

Desktop space images are displayed in thumbnail format in which the multiple desktop space images are arranged in chronological order, and this makes it easy for the user to evoke a memory of the target file. Upon selecting desktop space images to be displayed from among the multiple desktop space images, the desktop space images to be displayed may be extracted based on annotation written in the desktop space images. Further, upon selecting desktop space images to be displayed, multiple desktop space images associated with the same tag data may be extracted, or desktop space images obtained by performing AND logic or OR logic on multiple pieces of tag data may be extracted.

According to another aspect, file images of specific files varying from event to event and metadata including multiple pieces of tag data characterizing the operating environment of the computer within a predetermined period from the generation of each event are recorded in the recording device on an event-by-event basis. Upon searching, the multiple recorded file images are initially displayed. The user can refresh the user's recollection about the target file from a file image. When the user selects, from the multiple file images displayed, a specific file image that is most likely to evoke a memory of the target file, metadata associated with the specific file image is displayed. Then, when the user selects tag data from the metadata, the target file corresponding to the tag data is run. In this case, the event can be generated when a page of the specific file is changed.

There can be provided a computer program for helping a user retrieve a target file stored on a computer. Accordingly, there can also be provided a computer program for refreshing a user's recollection about target file on a computer as a graphic image. Further there can be provided a computer capable of refreshing a user's recollection about a target file as a graphic image to make it easy to retrieve the target file.

BRIEF DESCRIPTION OF THE DRAWINGS

FIG. 4 is a diagram showing an example of the data structure of metadata created by an associative data creating section at time t1 in FIG. 2.

DETAILED DESCRIPTION

Figures 1, 2:
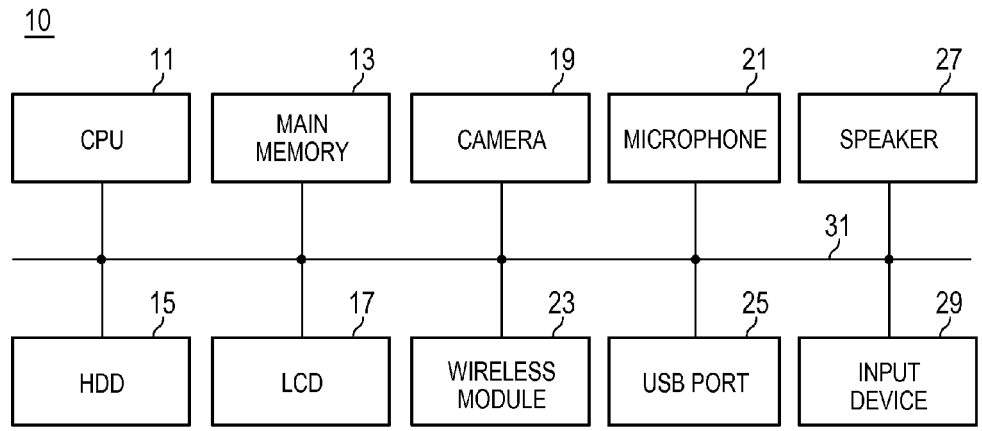
FIG. 1 is a functional block diagram showing a schematic configuration of the hardware of a computer according to an embodiment.
FIG. 2 is a diagram showing an example of the operating environment of the computer.

FIG. 1 is a functional block diagram showing a schematic configuration of the hardware of a computer 10 according to an embodiment. The computer 10 may be, but not particularly limited to, a notebook personal computer or a desktop personal computer. The computer 10 is configured such that a CPU 11, a main memory 13, an HDD 15, a liquid crystal display (LCD) 17, a built-in camera 19, built-in microphone 21, a wireless module 23, a USB port 25, a built-in speaker 27 and an input device 29 such as a keyboard and a mouse are connected to a bus 31. The bus 31 includes multiple chipsets such as a northbridge and a southbride. External devices, such as an external LCD, a projector, a microphone, a camera, an HDD, a Bluetooth (Registered Trademark) mouse, an optical disk drive (ODD), a blood pressure manometer, a pedometer and an oscilloscope, can be connected to the USB port 25. Since the hardware configuration of the computer 10 is well known, the description of each device will be omitted.

FIG. 2 is a diagram showing an example of the operating environment of the computer 10. Various programs run on the computer 10 with or without user's awareness, and part of information indicating the running states is displayed on the LCD 17. The information indicating the running states of the programs constructs the operating environment of the computer 10 at that time, including the kinds of programs being executed by the CPU 11 and the contents of windows displayed, the kinds and operating conditions of external devices connected to the USB port 25, and the hardware settings such as the volume of the speaker 27 and the brightness setting for the LCD 17.

As an example of the operating environment of the computer 10, FIG. 2 shows time-series states of internally used data and externally input data being processed on the computer 10 during a period between time t0 and time t4. FIG. 2 shows examples of application software for processing internally used data including document creation support software mainly used to create documents, presentation support software mainly used for presentation, a Web browser for accessing a Web server to browse documents or images, and video playback software for playing video. The application software for processing internally used data may also include mailing software for sending and receiving e-mails and spreadsheet software for creating spreadsheets.

Further shown in FIG. 2 as examples of software for processing externally input data are camera processing software for recording and playing pictures from the built-in camera 19 or an external camera connected to the USB port 25, microphone processing software for recording and playing sound from the built-in microphone 21 or an external microphone connected to the USB port 25, IP address acquiring software for acquiring the IP address of an access point to which the wireless module 23 is connected, and heart rate measuring software for processing the measurement results of the blood pressure manometer connected to the USB port 25. The software for processing externally input data may also include device drivers to control external devices such as the mouse and ODD connected to the USB port 25.

FIG. 2 shows the running state of each software during the period between time t0 and time t4, respectively. The document creation support software creates or updates a file whose file name is aaa.xy1 during a period between time t1 and time t3. The presentation support software displays a file whose file name is bbb.xy2 on the LCD 17 or a projector connected to the USB port 25 during the period between time t0 and time t4. The Web browser displays files whose file names are a.html to f.html on the LCD 17 during the period between time t0 and time t4. The video playback software plays a file whose file name is ccc.xy3 during a period between time t0 and time t1 using the LCD 17 and the speaker 27.

The camera processing software takes and records a picture in the HDD as a file whose file name is ddd.xy4 during the period between time t1 and time t4. The microphone processing software records and stores sound in the HDD 15 as a file whose file name is eee.xy5 during the period between time t0 and time t3. The IP address acquiring software acquires a.b.c.d as the IP address of an access point to which the wireless module 23 is connected during the period between time t0 and time t1, and e.f.g.h as the IP address of an access point connected during the period between time t1 and time t4. The heart rate measuring software acquires a heart rate nnn measured using the blood pressure manometer during the period between time t0 and time t1. Times t0 to time t4 are decided based on predefined events, generating graphic images at time t1 to time t4 in a manner to be described later.

Figure 3:
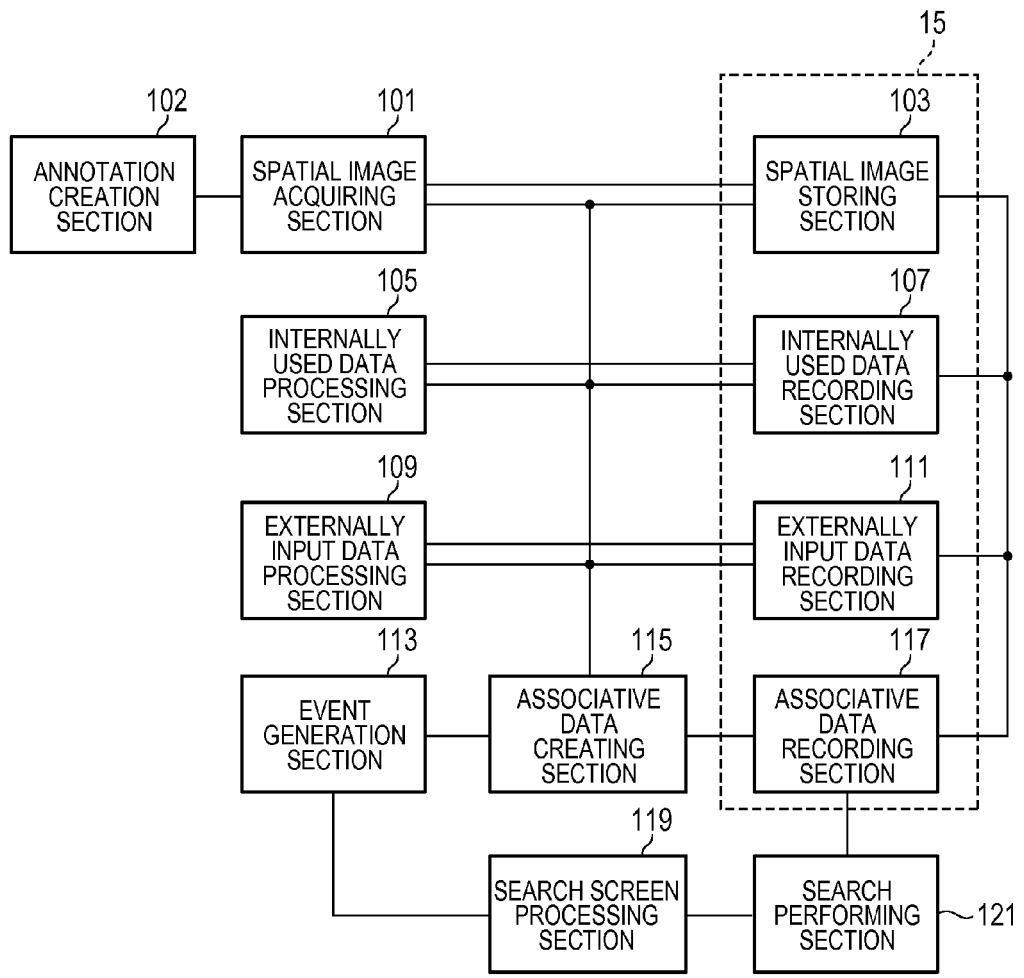
FIG. 3 is a functional block diagram showing a software/hardware configuration according to the embodiment.

FIG. 3 is a functional block diagram showing a software/hardware configuration according to the embodiment. FIG. 3 shows software functional blocks with the exception of the HDD 15. The software shown in FIG. 3 is stored in the HDD 15, loaded into the main memory 13 and executed by the CPU 11. The software for each functional block implements a predetermined function in cooperation with a known operating system (OS), a known device driver and the like. Each functional block may be configured as a single program module, or two or more functional blocks may be configured as a program module.

A spatial image acquiring section 101 acquires a desktop space image being displayed on the LCD 17 at the time an event occurs. The desktop space image is held in a VRAM for temporarily storing graphic images to be displayed on the LCD 17. For example, the spatial image acquiring section 101 can be configured by using a known program for capturing the desktop space image such as by holding a PrintScreen key down on the input device 29, with the click of the mouse, or with gestures. The desktop space image is configured to include not only active windows on the desktop but also the entire image to be displayed on the LCD 17. In accordance with instructions from an associative data creating section 115, the spatial image acquiring section 101 captures and stores the desktop space image in a spatial image storing section 103, and sends a file name of the desktop space image and its data path to the associative data creating section 115. The spatial image storing section 103, an internally used data recording section 107, an externally input data recording section 111, and an associative data recording section 117, are part of the storage areas in the HDD 15.

An annotation creation section 102 is known processing software for allowing a user to annotate the desktop space image displayed on the LCD 17 using the input device 29. Annotation written in the desktop space image by means of the annotation creation section 102 is sent to the associative data creating section 115 as tag data for the desktop space image written through the spatial image acquiring section 101 each time annotation is written. For example, when the user encloses a specific phrase by a line in a specific software window displayed on the desktop space image, the phrase is sent to the associative data creating section 115 as tag data for the written desktop space image.

An internally used data processing section 105 is configured by using the known pieces of software for internally used data shown in FIG. 2. The internally used data processing section 105 reads, into the main memory 13, a predetermined file stored in the internally used data recording section 107 to edit, display or play the file. When the user newly creates or edits a file, the internally used data processing section 105 records the file in the internally used data recording section 107. During processing of a file loaded on the main memory 13, each piece of software in the internally used data processing section 105 sends tag data to the associative data creating section 115 each time tag data associated with the processing is updated. For example, when the page of a file processed by the document creation support software is selected in a tag data item described with reference to FIG. 4, the internally used data processing section 105 sends the page information to the associative data creating section 115 each time the page is changed.

An externally input data processing section 109 is configured by using the known pieces of software for externally input data shown in FIG. 2. The externally input data processing section 109 records, in the externally input data recording section 111, images, sound and IP addresses externally input into the computer 10, or externally input data associated with the identifier of an external device and the like. The externally input data processing section 109 collects externally input data from the outside, or plays externally input data recorded in the externally input data recording section 111 using the LCD 17 and the speaker 27. During processing of a file loaded on the main memory 13, each software in the externally input data processing section 109 sends tag data to the associative data creating section 115 each time tag data associated with the processing is updated. For example, when the IP address acquired by the IP address acquiring software is selected in the tag data item described with reference to FIG. 4, the externally input data processing section 109 sends the IP address to the associative data creating section 115 each time the IP address is changed.

An event creation section 113 generates an event to determine time t0-t4 and sends the event to the associative data creating section 115. The event gives the timing of generating a desktop space image to refresh a user's recollection about a target file. It is desired to generate the event when a currently displayed desktop space image can give the user the strongest recollection about the target file. Examples of such events can include the time when the user turns the page to a new page during presentation with the presentation support software and the time when a distinctive window predefined in software for processing internally used data becomes active.

The event can also be generated when the microphone 21 starts recording, when the camera 19 starts taking a picture, or when the IP address of the access point connected through the wireless module 23 is changed. Further, the event can be generated when the user annotates the desktop space image through an annotation section 102, while the computer 10 is in use, or when a key assigned for a special purpose is held down. The user can select, as annotation, such a phrase on the desktop space image that seems to be a keyword for when the user later recalls the target file.

When the event is received from the event generation section 113, the associative data creating section 115 captures the desktop space image being displayed on the LCD 17 and instructs the spatial image acquiring section 101 to store the desktop space image in the spatial image storing section 103. Actual data of the desktop space image is stored in the spatial image storing section 103 in a data format such as BMP, JPEG or TIF. When new tag data is sent to the same tag data item from the internally used data processing section 105 and the externally input data processing section 109, the associative data creating section 115 updates tag data received up to that time.

For example, tag data including the name of a file browsed by the Web browser shown in FIG. 2 is updated by the associative data creating section 115 from a.html, to b.html and c.html during the period between time t0 and time t1. According to the event received at time t1 from the event generation section 113, the associative data creating section 115 fixes tag data for the desktop space image captured, and stores, as metadata, a string of tag data for the desktop space image in the associative data recording section 117. The associative data creating section 115 receives, as tag data, the annotation written by the annotation creation section 102 into the desktop space image from the spatial image acquiring section 101, and records the tag data in the associative data recording section 117 as part of metadata. The metadata for the desktop space image is created by the associative data creating section 115 in such a manner that multiple pieces of tag data are associated with one another in XML (Extensible Markup Language).

Tag data on internally used data can be the name of document creation support software or document browsing software and the name of a file and a page being processed. The tag data on internally used data can also be the subject name of e-mail processed by the mailing software, the send or receive time and the name of a sender or an addressee. Further, tag data on internally used data can be the URL browsed by the Web browser or the name of video playback software, the name of a file being processed, the start time and the stop time.

Tag data on externally used data can be the name of camera processing software or microphone processing software, the name of a file being processed, the start time and the stop time. Tag data on externally used data can also be the volume of sound collected by the microphone and the direction of a sound source. Further, tag data on externally used data can be the IP address of a network connected, the start time and the stop time, or the name of a device connected to the USB port 25, the start time and the stop time.

Metadata created by the associative data creating section 115 based on FIG. 2 will be described. Actual data or portions of desktop space images whose file names are image #001, image #002, image #003 and image #004 are recorded in the spatial image storing section 103 at times t1, t2, t3 and t4, respectively, and each file name and data path specifying the recording location in the HDD 15 are recorded in the associative data recording section 117 as part of metadata. Further, tag data for image #001, image #002, image #003 and image #004 existing as the operating environment of the computer 10 during the period between time t0 and time t1, the period between time t1 and time t2, the period between time t2 and time t3, and the period between time t3 and time t4 are recorded in the associative data recording section 117 as metadata related to the desktop space images, respectively. Actual data indicated by each set tag data is recorded in the internally used data recording section 107 or the externally input data recording section 111.

A search screen processing section 119 displays a desktop space image on the LCD 17 to refresh recollection about a target file on the LCD 17, and further displays a file selection screen on the LCD 17 to acquire the target file. The file selection screen can be configured by metadata alone or the desktop space images and metadata associated therewith. The search screen processing section 119 can reduce the size of the multiple desktop space images recorded in the spatial image storing section 103 and display the images in a thumbnail format. Based on an instruction from the search screen processing section 119, a search performing section 121 searches for multiple desktop space images from the spatial image storing section 103 through the associative data recording section 117, further acquires, from the associative data recording section 117, metadata associated with each desktop space image acquired, and sends the acquired metadata to the search screen processing section 119.

FIG. 4 is a diagram showing an example of the data structure of metadata created by the associative data creating section 115 at time t1 in FIG. 2. Metadata 150 is such that multiple pieces of tag data created based on the event that occurred at time t1 are associated with a desktop space image whose file name is image #001. The format of metadata 150 is created based on tag data items predefined to be received from the spatial image acquiring section 101, the internally used data processing section 105 and the externally input data processing section 109. The tag data items include annotation, software name, file name, page, URL, start/stop time, etc. The metadata 150 can be configured by associating respective pieces of tag data in the form of a tree. For example, when multiple files are processed by the presentation support software, the page(s) can be configured as tag data located below each file.

In FIG. 2, since the document creation support software creates, edits or displays nothing during the period between time t0 and time t1, no tag data is recorded. As tag data related to the presentation support software, the file name, bbb.xy2, displayed at time t1 and 10 as the number of pages displayed at that time are recorded. As tag data related to the Web browser, the file name, c.html, browsed at time t1 among the files a.html, b.html and c.html updated during the period between time t0 and time t1 is recorded.

As tag data related to the video playback software, the file name, ccc.xy3, played during the period between time t0 and time t1, the start time 00:bb:cc and the stop time 00:dd:ee are recorded. The camera processing software takes and plays no picture during the period between time t0 and time t1, so that no tag data is recorded. As tag data related to the microphone processing software, the file name, eee.xy5, recorded during the period between time t0 and time t1, the recording start time aa:bb:cc and the recording stop time cc:dd:ee during the period between time t2 and time t3 are recorded.

Since the recording stop time is not set at time t1, the associative data creating section 115 acquires the recording stop time from the externally input data processing section 109 or the externally input data recording section 111 upon creating metadata at time t3, and records it in the metadata 150. As tag data related to the IP address acquiring software, the IP address, a.b.c.d, of the access point to which the wireless module 23 is connected during the period between time t0 and time t1, the start time 00:aa:cc and the stop time 00:ee:ff are recorded. In the internally used data recording section 107 and the externally input data recording section 111, actual data linked to tag data are so recorded that actual data can be loaded into the main memory 13 by selecting, using the input device 29, tag data displayed on the LCD 17.

Figure 5:
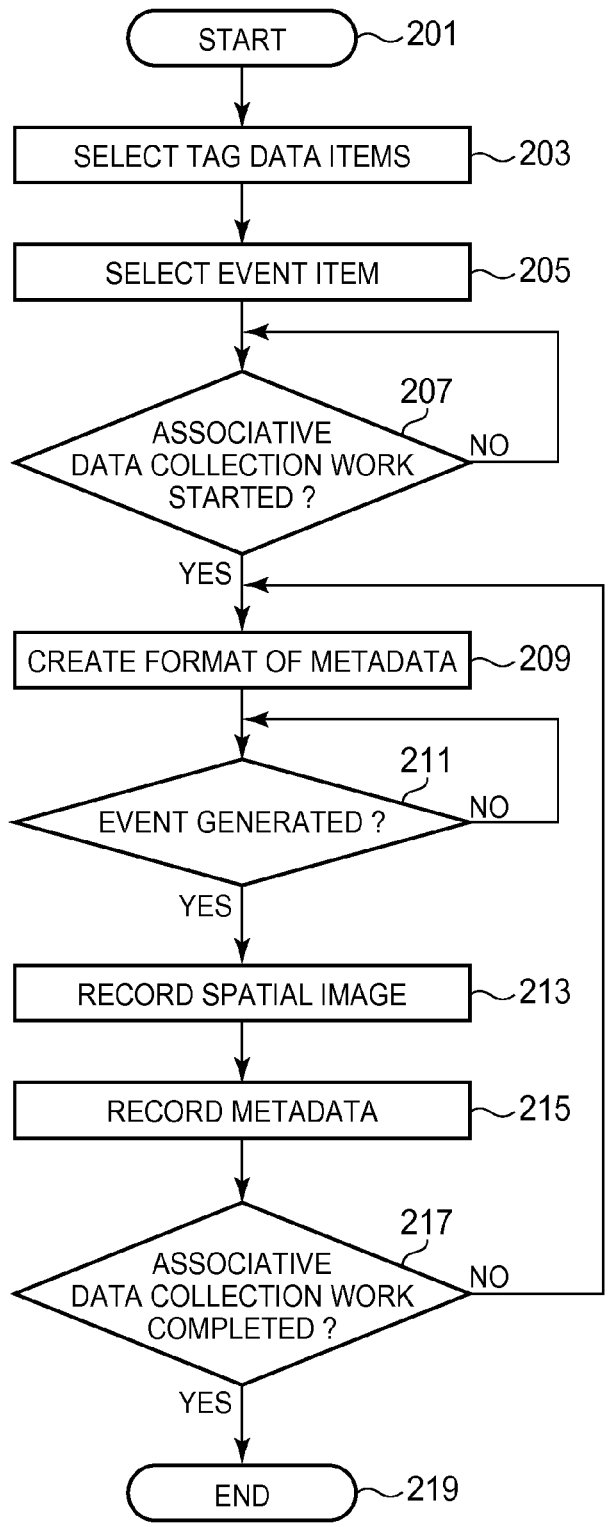
FIG. 5 is a flowchart showing a procedure for accumulating associative data.
Figure 6:
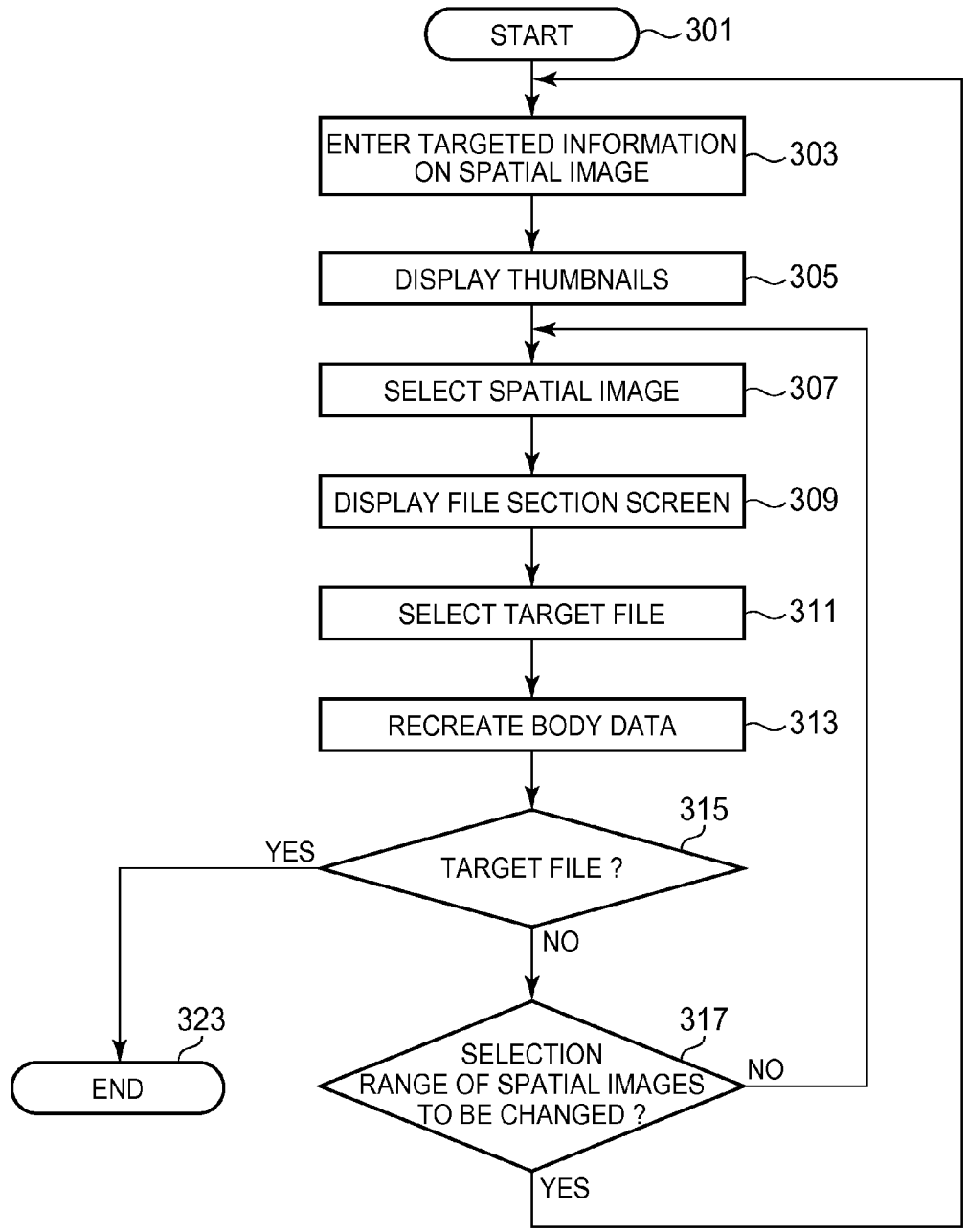
FIG. 6 is a flowchart showing a procedure to search for a target file using the associative data.

Next will be described a procedure for recreating a target file, on which the user dimly remembers processing in the past, using a desktop space image and metadata to perform a search. FIG. 5 is a flowchart showing a procedure for accumulating associative data, and FIG. 6 is a flowchart showing the procedure to search for the target file using the associative data. Here, the associative data consists of a desktop space image created for each event and metadata associated therewith. When the computer 10 is activated in block 201, the user determines, in block 203, tag data items, such as software name, file name, page, URL, time information and IP address as described with reference to FIG. 4, through the search screen displayed on the LCD 17 by the search screen processing section 119.

In block 205, the user further selects an event item through the search screen. Here, it is assumed that the user uses the presentation support software and sets an event generation item to generate an event when the user performs a page operation. One or more event items are selectable. After that, the user uses the computer 10 as usual without being aware of the associative data collection work.

In block 207, the procedure waits until the event to start the associative data collection work is generated. The associative data collection work can be started when the user holds a specific key down on the keyboard 29, when a specific program is started, or when the computer 10 becomes aware that a specific external device is loaded. Here, it is assumed that the associative data collection work is started when the presentation support software is launched. Thus, the associative data collection work is started at time t0 in FIG. 2.

In block 209, the format of metadata shown in FIG. 4 is created on the main memory 13 in the XML data format based on the event item selected in block 205 by the associative data creating section 115. Then, for the tag data items set in block 203, tag data on internally used data is acquired from the internally used data processing section 105 and tag data on externally input data is acquired from the externally input data processing section 109. The tag data acquired is stored in the main memory 13. When receiving new tag data for the same tag data item, the associative data creating section 115 updates the tag data and continues the processing for the period from time t0 to time t1. Since the document creation support software and the camera processing software are not executed until time t1, tag data items for them remain empty. The associative data creating section 115 records a tag data item corresponding to a page after operation each time a page is operated via the presentation support software. When a new page is operated, the previous page is so updated that the previous page is overwritten.

Whenever the Web browser changes the URL to be browsed, the associative data creating section 115 updates and stores the file name in the corresponding tag data item. The associative data creating section 115 stores the file name, ccc.xy3, executed by the video playback software, the start time and the stop time in the corresponding tag data items.

The associative data creating section 115 stores the software name (eee.xy5) of the microphone processing software and the recording start time. Note that the microphone processing software adds a time tag to the file eee.xy5 each time an event occurs so that the time of occurrence of the event can be set as the playback start time or the playback stop time when being retrieved and executed later. The associative data creating section 115 stores the time to start the connection with the IP address acquired by the IP address acquiring software and the connection stop time. The associative data creating section 115 stores annotation received from the spatial image acquiring section 101.

In block 211, the event generation section 113 generates an event at time t1 in response to a page operation via the presentation support software. In block 213, in response to the generation of the event, the associative data creating section 115 instructs the spatial image acquiring section 101 to capture a desktop space image displayed on the LCD 17 at the time and record the captured desktop space image in the spatial image storing section 103. Simultaneously, the associative data creating section 115 acquires the file name (image #001) of the desktop space image captured from the spatial image acquiring section 101 and its data path, and stores them in the main memory 13 as part of metadata. Then, in block 215, the associative data creating section 115 fixes metadata related to the desktop space image whose file name is image #001 at time t1 and records the metadata in the associative data recording section 117.

In block 217, the search screen processing section 119 determines whether the associative data creating section 115 completes the associative data collection work. The event of completion of the associative data collection work can be generated from a change in state of the same software relative to the start event in block 207. Returning from block 217 to block 209, associative data is recorded in the associative data recording section 117 in the same procedure until time t4. If the procedure exits the presentation support software upon reaching time t4 in block 217, an event to end the associative data collection work is generated in block 219 to complete the associative data collection work. If the tag data items and the event item are reset to the initial settings in block 203 and block 205, the procedure from block 207 to block 219 is subsequently automatically performed without making the user aware of it to accumulate associative data while the user is doing normal work.

Next will be described the procedure to search for an ambiguous target file using the accumulated associative data. The user may vaguely remember creating or using the target file in the past but may not remember the file name or the date of using the target file with enough certainty to retrieve the target file from the HDD 15. For example, it is assumed that the user dimly remembers recording a specific content of what a speaker has talked about in the past, and wants to retrieve it as a target file. Since the user is more likely to remember a desktop space image displayed at the time the user recorded the speaker, the user's recollection about the target file is refreshed through associative data consisting of the desktop space image and metadata to narrow down the scope of search for the target file.

When the computer 10 is activated in block 301, the user searches in block 303 for the desktop space image recorded in the spatial image storing section 103 through a search screen provided on the LCD 17 by the search screen processing section 119. The user enters a variety of search conditions on the search screen, such as annotation written by the user, a certain period considered to be the period of recording using the microphone processing software, and the name of another software that the user remembers using at that time. The search screen processing section 119 instructs the search performing section 121 of the search conditions entered.

The search performing section 121 searches the associative data recording section 117 for multiple desktop space images corresponding to the search conditions, extracts desktop space images from the spatial image storing section 103, and sends them to the search screen processing section 119. In block 305, the search screen processing section 119 displays the received multiple desktop space images on the LCD 17 in a thumbnail format in which the reduced multiple spatial images are arranged in chronological order. In block 307, the user selects a specific desktop space image from among the multiple desktop space images based on recollection about a graphic image previously displayed during recording. The desktop space images are arranged in a thumbnail format on one screen in chronological order, making it easier for the user to recall the operating environment of the computer 10 the user previously experienced.

Here, it is assumed that the user selects a desktop space image whose file name is image #001 created at time t1 in FIG. 2. In this process of selection, when the user vaguely remembers recording the target file, the desktop space image can refresh the user's recollection, helping the user to remember the desktop space image displayed during actual recording to help the user retrieve the target file. The specific desktop space image selected by the user is indicated from the search screen processing section 119 to the search performing section 121. The search performing section 121 acquires corresponding metadata from the associative data recording section 117 and sends the acquired metadata to the search screen processing section 119.

Figure 7:
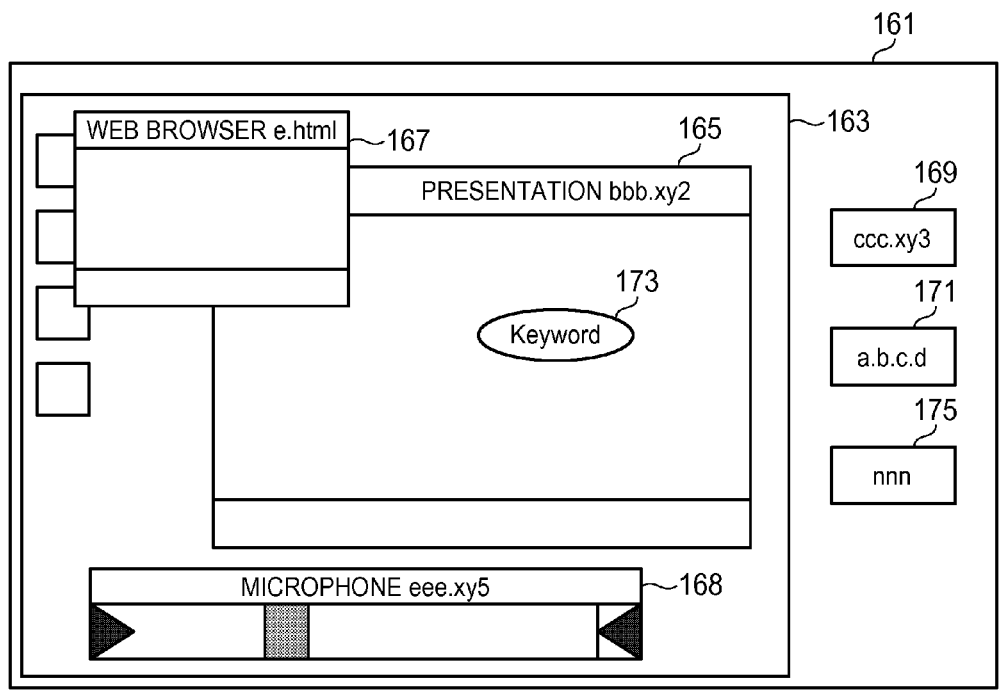
FIG. 7 is a diagram showing an example of a file selection screen.

In block 309, associative data consisting of the selected specific desktop space image and the metadata corresponding thereto is displayed as the file selection screen on the LCD 17 by means of the search screen processing section 119. FIG. 7 shows an example of the file selection screen. Displayed in a window 161 of the file selection screen generated by the search screen processing section 119 and displayed on the LCD 17 are a desktop space image 163 whose file name is image #001, an icon 169 specifying the video playback software and a file whose file name is ccc.xy3, an icon 171 specifying the IP address acquiring software and the IP address, and an icon 175 specifying the heart rate measuring software and the heart rate nnn. The icons 169, 171 and 175 are created to display tag data that did not originate from the operating environment of the computer 10 in the instant of time t1 at which the desktop space image whose file name is image #001 is generated.

The other tag data is displayed at time t1 in a window 165 created by the presentation support software, a window 167 created by the Web browser, a window 168 created by the microphone processing software, and the desktop space image 163 as annotation 173 written by the user through the annotation section 102, respectively. In block 311, the user selects the window 168 assumed to be the target file from the tag data included in the window 161. The target file is selected from the metadata.

The window 168 is linked to the sound file eee.xy5 from the start time aa:bb:cc to the stop time cc:dd:ee stored in the HDD 15. When it is selected in block 313 using the input device 29, the sound recorded from time aa:bb:cc to time t0 is played. If the desktop space image (image #002) at time t2 and the window 168 are selected, the sound recorded from time t1 to time t2 is played. If the desktop space image (image #003) at time t3 and the window 168 are selected, the sound recorded from time t2 to time cc:dd:ee is played. Since the search in the embodiment is performed when the user does not remember the name or the date and time of creation of the target file, the user is runs the file and check the content in order to acknowledge the target file.

In block 315, the user listens to the sound to determine whether the file whose file name is eee.xy5 is the target file, and if determining that it is the target file, the search is ended at block 323. If determining that it is not the target file, the procedure proceeds to block 317 to determine whether the thumbnails displayed in block 305 need changing. If determining that they do not need changing, the procedure returns to block 307 to select another desktop space image and repeat the same procedure. If determining that the annotation, the period or the file name entered in block 303 needs changing, the procedure returns to block 303 to repeat the same procedure.

The user may feel that a specific file was used at the same time while recording the target file. In such a case, the desktop space images including the specific file in the metadata as tag data can be selectively displayed in blocks 303 and 305. Narrowing down desktop space images using the same tag data makes it easy to retrieve the target file. For example, if the user determines that the file e.html displayed by the Web browser is most likely to be associated with the target file, desktop space images including the file in the metadata can be displayed.

Further, an AND search or an OR search can be performed on multiple pieces of tag data to select a desktop space image associated with the target file. For example, if it is determined that it is highly likely that the user ran either a file of the video playback software or a file of the presentation support software at the same time when recoding the target file, an OR search can be performed on desktop space images having the two file names as tag data. Thus, the desktop space image can be searched for based on the single tag data or multiple pieces of tag data to narrow down the scope of search.

Figure 8:
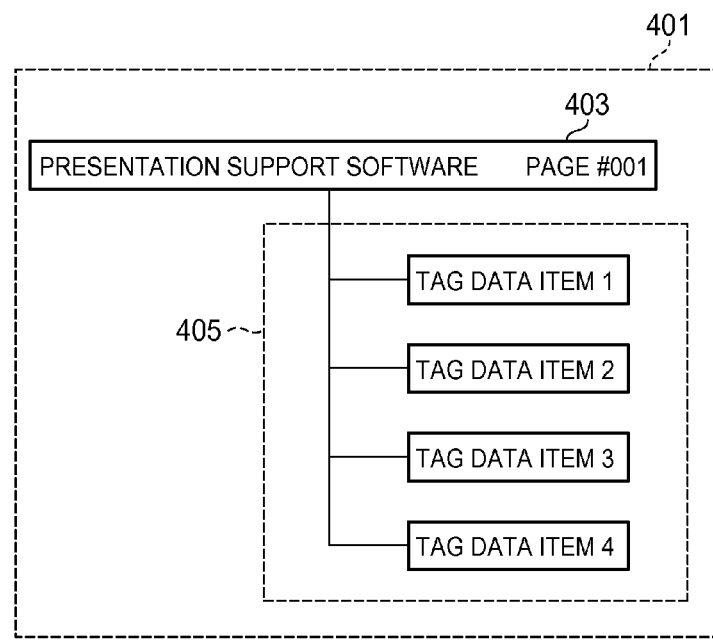
FIG. 8 is a diagram showing the data structure of associative data when a file image is used as a graphic image.

While the method using the desktop space image as associative data used for searching has been described, there is another method using, as associative data, a file image for each page of a file corresponding to specific tag data. For example, the associative data creating section 115 can create metadata indicating a page varying each time a page operation is performed on the specific file of the presentation support software to replace the file image for each page with a desktop space image. FIG. 8 is a diagram for describing the data structure of associative data when a file is used as a graphic image. Associative data 401 is associated with tag data 405 for each page 403 of the presentation support software, and file images for multiple pages are displayed on the file selection screen in a thumbnail format by means of the search screen processing section 119. When the user selects file images for pages, the selected file images and icons of tag data associated therewith are displayed on the file selection screen. Thus, the user can associate a file image for each page with the target file to narrow down the scope of search.

While specific embodiments have been shown in the drawings, the present invention is not intended to be limited to the embodiment shown in the drawings, and any known configuration can, of course, be adopted as long as it has the effects of the present invention as defined in the claims.

DESCRIPTION OF SYMBOLS

150 . . . Metadata
161 . . . Window of File Selection Screen
163 . . . Desktop Space Image
165 . . . Window Created by Presentation Support Software
167 . . . window Created by Web Browser
168 . . . window Created by Microphone Processing Software
169 . . . Icon of Video Playback Software
171 . . . Icon of IP Address Acquiring Software
173 . . . Annotation

What is claimed is:

1. A non-transitory storage device comprising a computer program, the computer program causing a computer to execute the steps of:
  capturing a desktop space image in response to an event on the computer, the event comprising a window processing user created data in an internal file becoming active;
  recording metadata associated with the desktop space image, the metadata comprising tag data for each software process comprising a software name, a file name, and a start time, and a stop time;
  displaying the captured desktop space image and the metadata associated with the desktop space image; and
  running a target file corresponding to the tag data selected from the displayed metadata.

2. The non-transitory storage device according to claim 1, the computer program further performs displaying a plurality of recorded desktop space images recorded, on an event-by-event basis, from a plurality of events.

3. The non-transitory storage device according to claim 2, wherein displaying the plurality of recorded desktop space images further comprises displaying the plurality of desktop space images arranged chronologically in a thumbnail format.

4. The non-transitory storage device according to claim 2, wherein displaying the plurality of recorded desktop space images includes a step of extracting a desktop space image selected based on annotation written in the desktop space image.

5. The non-transitory storage device according to claim 2, wherein displaying the plurality of recorded desktop space images further comprises extracting a plurality of desktop space images associated with the tag data.

6. The non-transitory storage device according to claim 2, wherein displaying the plurality of recorded desktop space images further comprises performing one of AND logic and OR logic on the tag data to extract a particular desktop space image.

7. The non-transitory storage device according to claim 1, wherein recording metadata further comprises recording metadata within a predetermined time period from the generation of the event and wherein the tag data characterizes an operating environment of the computer within the predetermined time period.

8. The non-transitory storage device according to claim 1, wherein the metadata comprises internally used data generated from one or more of document creation support software, presentation support software, a Web browser, mailing software, spreadsheet software and video playback software.

9. The non-transitory storage device according to claim 1, wherein the metadata further comprises externally input data generated from one or more of camera processing software, microphone processing software, IP address acquiring software and software for controlling an external device.

10. The non-transitory storage device according to claim 1, wherein an event further comprises a change in a displayed file page, an activation of a software window, a start of a microphone recording, a camera taking an image, a change in an IP address, and a keyboard input.

11. The non-transitory storage device according to claim 1, wherein recording the metadata further comprises recording the tag data updated during a period from a previous event to a present event.

12. A non-transitory storage device storing a computer program, the computer program causing a computer to execute the steps of:
  capturing a file image for each event of a plurality of events on the computer, respective events comprising a window processing user created data in an internal file becoming active;
  recording metadata associated with each file image, the metadata comprising tag data for each software process comprising a software name, a file name, a start time, and a stop time within a predetermined period from generation of each event;
  displaying the plurality of captured file images;
  displaying the metadata associated with a specific file image selected from among the plurality of displayed file images; and
  running a target file corresponding to the tag data selected from the displayed metadata.

13. The non-transitory storage device according to claim 12, wherein one of the plurality of events further comprises a change to a file accessible by the computer.

14. The non-transitory storage device according to claim 12, wherein the metadata further comprises internally used data generated from one or more of document creation support software, presentation support software, a Web browser, mailing software, spreadsheet software and video playback software.

15. The non-transitory storage device according to claim 12, wherein the metadata further comprises externally input data generated from one or more of camera processing software, microphone processing software, IP address acquiring software and software for controlling an external device.

16. A computer comprising:
  a processor;
  an event generation section for generating a plurality of events, the plurality of events comprising a window processing user created data in an internal file becoming active;
  an associative data creating section for capturing, for each event of the plurality of events, desktop space images,
  the associative data creating section recording metadata associated with each of the desktop space images, the metadata comprising tag data for each software process comprising a software name, a file name, a start time, and a stop time; and
  a search screen processing section for displaying the plurality of captured desktop space images on a display, the search screen processing section displaying a file selection screen on the display, the file selection screen comprising tag data associated with a specific desktop space image selected from among the displayed desktop space images, the search screen processing section running a target file corresponding to the tag data selected from the file selection screen.

17. The computer according to claim 16, wherein the file selection screen includes the specific desktop space image.

18. The computer according to claim 16, wherein the associative data creating section recording the metadata further comprises the associative data creating section recording the tag data updated during a period from a previous event to a present event.

19. The computer according to claim 16, wherein the search screen processing section extracts a desktop space image selected based on annotation written in the desktop space image.

20. The computer according to claim 16, wherein the search screen processing section extracts a plurality of desktop space images associated with the tag data.

* * * * *